United States Patent
Bernier et al.

(10) Patent No.: US 9,872,428 B2
(45) Date of Patent: Jan. 23, 2018

(54) AGRICULTURAL IMPLEMENT WITH A WEIGHT DISTRIBUTION SYSTEM

(71) Applicant: CNH Industrial America LLC, New Holland, PA (US)

(72) Inventors: Kevin T. Bernier, North Prairie, WI (US); Martin L. Krohn, DeGraff, MN (US)

(73) Assignee: CNH Industrial America LLC, New Holland, PA (US)

( * ) Notice: Subject to any disclaimer, the term of this patent is extended or adjusted under 35 U.S.C. 154(b) by 112 days.

(21) Appl. No.: 14/285,076

(22) Filed: May 22, 2014

(65) Prior Publication Data
US 2015/0334916 A1    Nov. 26, 2015

(51) Int. Cl.
*A01C 23/00* (2006.01)
*A01M 7/00* (2006.01)
*A01C 23/04* (2006.01)

(52) U.S. Cl.
CPC ......... *A01C 23/008* (2013.01); *A01M 7/0042* (2013.01); *A01M 7/0085* (2013.01); *Y10T 29/49766* (2015.01)

(58) Field of Classification Search
None
See application file for complete search history.

(56) References Cited

U.S. PATENT DOCUMENTS

| | | | |
|---|---|---|---|
| 5,556,115 A | 9/1996 | Heyring | |
| 5,863,057 A * | 1/1999 | Wessels | B62D 53/068 280/149.2 |
| 5,996,858 A * | 12/1999 | Tapp et al. | A01G 25/14 222/538 |
| 6,363,331 B1 | 3/2002 | Kyrtsos | |
| 6,921,100 B2 | 7/2005 | Mantini et al. | |
| 7,072,763 B2 | 7/2006 | Saxon et al. | |
| 7,770,904 B2 | 8/2010 | Passeri | |
| 7,784,570 B2 * | 8/2010 | Couture | B25J 5/005 180/65.8 |
| 8,313,111 B2 | 11/2012 | Ahuja et al. | |
| 2008/0217985 A1 * | 9/2008 | Botha | B60P 1/286 298/11 |
| 2011/0253466 A1 | 10/2011 | Sedoni et al. | |
| 2011/0301785 A1 * | 12/2011 | Sword | B62D 55/075 701/2 |
| 2012/0265401 A1 | 10/2012 | Stuetzler et al. | |

FOREIGN PATENT DOCUMENTS

| | | |
|---|---|---|
| WO | 92/05970 A1 | 4/1992 |
| WO | 2004/082792 A1 | 9/2004 |

\* cited by examiner

*Primary Examiner* — Abby Lin
*Assistant Examiner* — Paul Castro
(74) *Attorney, Agent, or Firm* — Rebecca L. Henkel; Rickard K. DeMille

(57) ABSTRACT

An agricultural implement for applying an ingredient to a geographic area, the agricultural implement includes a chassis, weight bearing conveyance devices, a component and a weight distribution system. The weight bearing conveyance devices including a fore conveyance device and an aft conveyance device. The fore and aft conveyance devices are connected to and carry the chassis respectively in a fore and an aft position. The component is carried by and coupled to the chassis. The weight distribution system is configured to allow an adjustment of a position of the component relative to the chassis.

17 Claims, 3 Drawing Sheets

AGRICULTURAL IMPLEMENT WITH A WEIGHT DISTRIBUTION SYSTEM

BACKGROUND OF THE INVENTION

1. Field of the Invention

The present invention relates to agricultural implements, and, more particularly, to agricultural sprayers having at least one onboard tank for holding agricultural chemicals.

2. Description of the Related Art

Agricultural sprayers apply a liquid to a crop or the ground at a specified application rate. The liquid may be in the form of a solution or mixture, with a carrier liquid (such as water) being mixed with one or more active ingredients (such as a herbicide, fertilizer and/or a pesticide). The application rate can vary over different parts of a field through the use of precision farming techniques, such as by using GPS data to activate/deactivate boom sections of the sprayer as the sprayer traverses over the field.

Agricultural sprayers may be pulled as an implement or self-propelled, and typically include a tank, a pump, a boom assembly, and a plurality of nozzles carried by the boom assembly at spaced locations. The boom assembly typically includes a pair of wing booms, with each wing boom extending to either side of the sprayer when in an unfolded state. Each wing boom may include multiple boom sections, each with a number of spray nozzles (also sometimes referred to as spray tips). Of course, a self-propelled sprayer also includes an onboard power plant (e.g., diesel engine) providing motive force and other power such as hydraulic power, electrical power, etc.

Agricultural sprayers may generally be divided into two types or methods of application: a batch application method, and a metered application method. With a batch application method, a tank is filled with the carrier liquid, one or more active ingredients are mixed with the carrier liquid in the tank, and the solution or mixture is applied at a predetermined application rate over the field (defined by vehicle travel speed, nozzle size and fluid operating pressure). A batch application method is effective but is not sensitive to different application needs across the field. Moreover, it is rarely the case where liquid in the tank is not left over at the end of spraying, which then must be discarded. These factors increase the operating costs associated with a batch application method.

With a metered application method, the active ingredient(s) are mixed at a metered rate with the carrier liquid as it is transferred from a carrier tank to the sprayer nozzles. Such metering may be carried out using pumps, venturi nozzles or controllable valves. A metered application method allows the application rate to be more easily changed "on-the-fly" across a field, and avoids the need to dispose of unused spray solution at the end of a spray operation (except what may be left in the lines, pump, etc. between the tank and nozzles).

Conventional sprayers using a metered application method include a carrier tank and one or more active ingredient tanks, all of which are permanently mounted to the sprayer chassis. The carrier liquid is pumped from a nurse tank (e.g., carried on a flat truck or trailer) to the carrier tank on the sprayer using a transfer pump and fill lines. Similarly, the active ingredient(s) are pumped from a nurse tank to a respective active ingredient tank on the sprayer using a transfer pump and fill lines.

What is needed in the art is an agricultural sprayer which can selectively shift the weight distribution and hence the center of gravity of the sprayer.

SUMMARY OF THE INVENTION

The present invention provides an agricultural implement with a weight distribution system applied to an agricultural sprayer.

The invention in one form is directed to an agricultural implement for applying an ingredient to a geographic area, the agricultural implement includes a chassis, weight bearing conveyance devices, a component and a weight distribution system. The weight bearing conveyance devices including a fore conveyance device and an aft conveyance device. The fore and aft conveyance devices are connected to and carry the chassis respectively in fore and aft positions. The component is carried by and coupled to the chassis. The weight distribution system is configured to adjust a position of the component relative to the chassis in order to shift a weight distribution between the fore conveyance device and the aft conveyance device.

The invention in another form is directed to a weight distribution system for an agricultural implement for applying an ingredient to a geographic area, the agricultural implement includes a chassis, weight bearing conveyance devices, and a component. The weight bearing conveyance devices including a fore conveyance device and an aft conveyance device. The fore and aft conveyance devices are connected to and carry the chassis respectively in fore and aft positions. The component is carried by and coupled to the chassis. The weight distribution system is configured to adjust a position of the component relative to the chassis dependent upon a detected weight distribution between the fore conveyance device and the aft conveyance device.

The invention in yet another form is directed to a method of distributing weight of an agricultural implement configured to apply an ingredient to a geographic area. The agricultural implement has a chassis and a plurality of weight bearing conveyance devices including a fore conveyance device and an aft conveyance device. The fore and aft conveyance devices are connected to and carry the chassis respectively in a fore and an aft position of the chassis. There is at least one component carried by and coupled to the chassis. The method includes the steps of detecting and adjusting. The detecting step detects a weight distribution between the fore conveyance device and the aft conveyance device. The adjusting step adjusts a position of the component relative to the chassis dependent upon a detected weight distribution determined in the detecting step.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
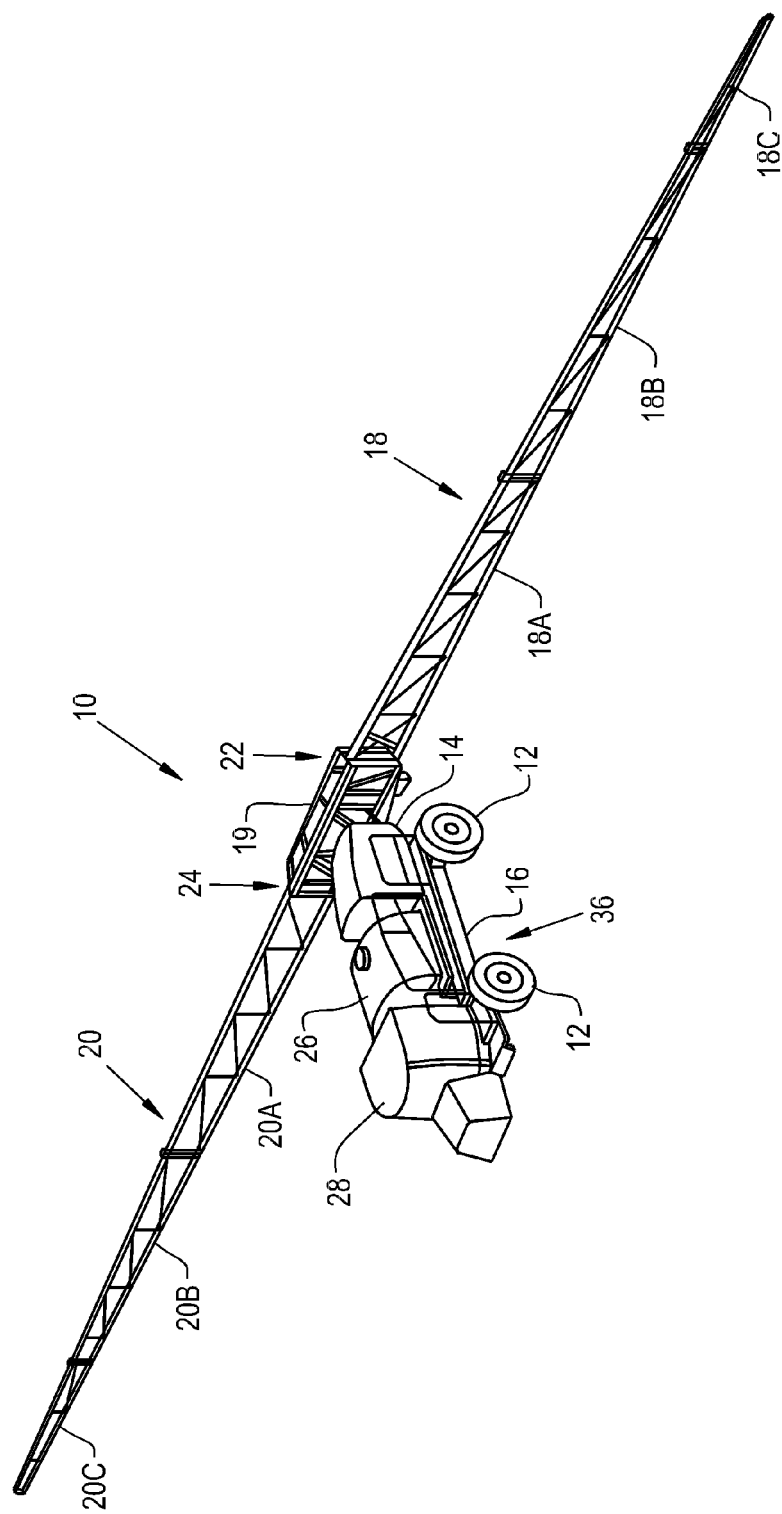
FIG. 1 is a perspective view of an embodiment of an agricultural sprayer having a weight distribution system of the present invention, shown traversing over a geographic area such as a field.

Referring now to the drawings, and more particularly to FIG. 1, there is shown an agricultural sprayer 10 according to one embodiment of the present invention. Agricultural sprayer 10 is shown as a self-propelled sprayer with a plurality of wheels 12 and a prime mover in the form of an internal combustion (IC) engine (e.g., diesel engine) within an engine compartment 14. However, agricultural sprayer 10 could also be a track-type self-propelled vehicle for certain applications.

Agricultural sprayer 10 includes a chassis 16 to which a pair of wing booms 18 and 20 are connected, united by a center boom 19. For sake of description, wing boom 18 is considered a left wing boom and wing boom 20 is considered a right wing boom. The wing booms 18, 20 are connected to center boom 19, joined about respective pivot connections 22, 24. Center boom 19 is connected at or near the rear of chassis 16. The wing booms 18, 20 are designed to fold forward toward the leading end of chassis 16 when wing booms 18, 20 are moved from an extended position, shown in FIG. 1, to a stowed or transport position (not shown).

Each wing boom 18, 20 supports a number of boom sections 18A, 18B, 18C, 20A, 20B and 20C. Center boom 19 and wing boom sections 18A, 18B, 18C, 20A, 20B and 20C each include a number of spray nozzles (not shown). In the embodiment shown, each wing boom has three boom sections, corresponding to the fold locations of the wing boom.

Figure 2:
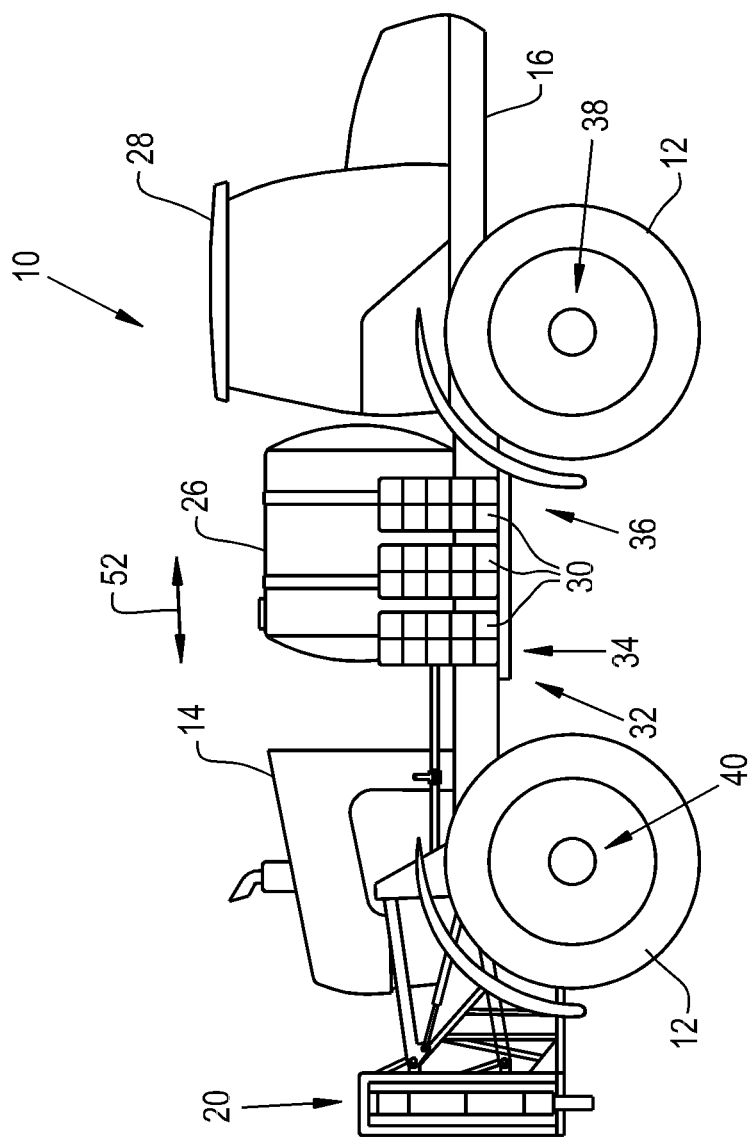
FIG. 2 is a side view of the agricultural sprayer shown in FIG. 1.

Referring now to FIG. 2, a carrier tank 26 is positioned generally in the center of chassis 16 between wing booms 18, 20 and behind an operator cab 28. Carrier tank 26 is designed to contain a carrier fluid, typically water, which is fed to the spray nozzles through a series of fluid lines (not shown). The water is mixed in a metered fashion with one or more active ingredients (i.e., agricultural chemicals such as fertilizer, herbicide or pesticide) stored in respective active ingredient tanks 30 also carried onboard sprayer 10. Metering devices for metering an active ingredient into a carrier liquid from carrier tank 26 are known in the art and not described in greater detail herein. Operator cab 28 contains a control panel (not shown) that has various operator controls for controlling operations of the sprayer and its components including the controlling of a weight distribution system 36. Although a meter spraying system is depicted the present invention is also applicable to a non-metered system.

Agricultural sprayer 10 includes a storage area 32 associated with chassis 16 which is configured for, and dedicated to, removable storage of each active ingredient tank 30. In the illustrated embodiment, storage area 32 includes a support structure 34, which is coupled to chassis 16. Support structure 34 has a generally horizontal platform for supporting each active ingredient tank 30.

Figure 3:
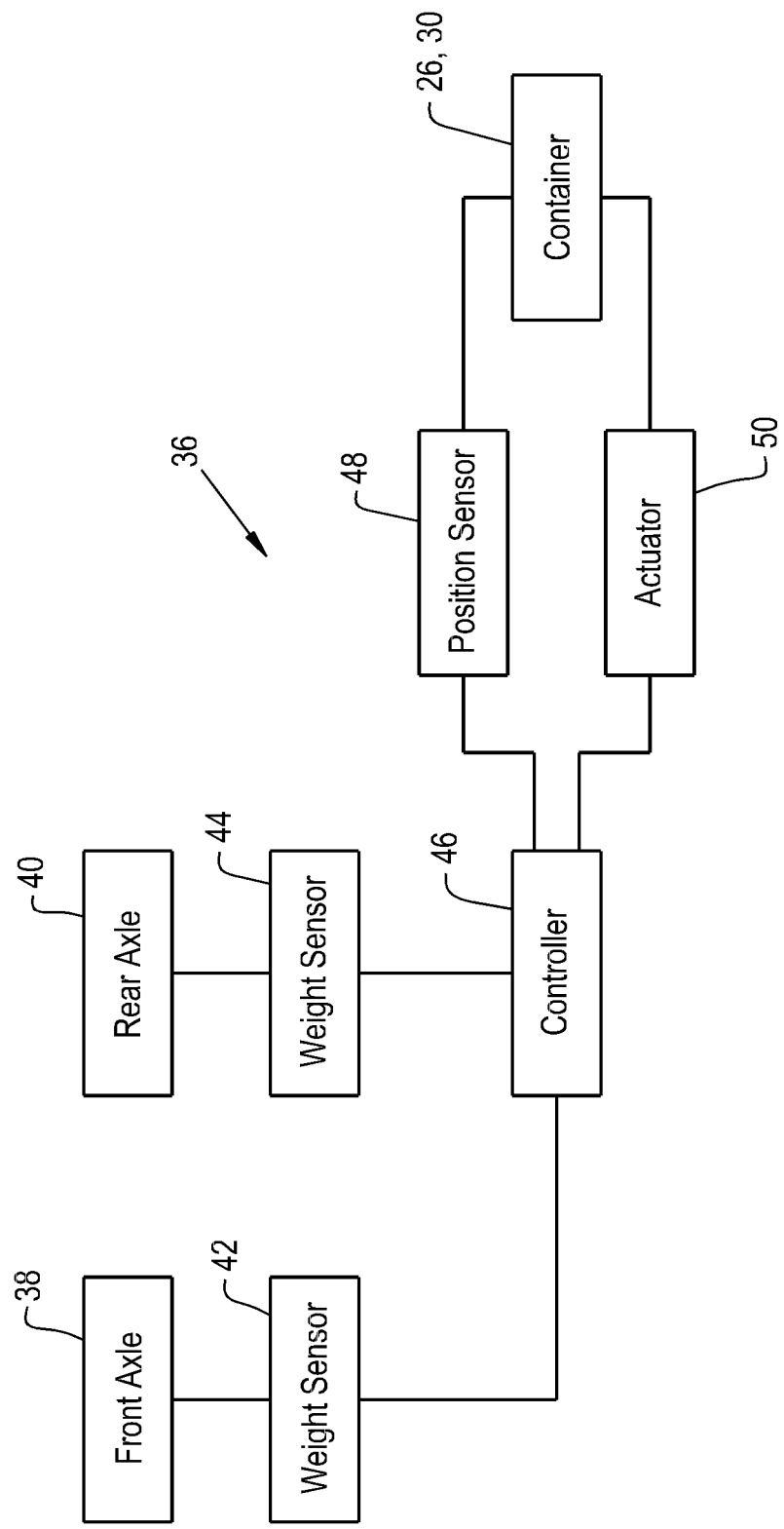
FIG. 3 is a schematic view of an embodiment of the weight distribution system associated with the sprayer of FIGS. 1 and 2.

Now, additionally referring to FIG. 3 there is illustrated in schematical form an embodiment of weight distribution system 36 for the detection of the weight distribution of agricultural sprayer 10 and for the alteration of the weight distribution in order to enhance the performance characteristics of agricultural sprayer 10. Weight distribution system 36 determines the weight carried by a front axle assembly 38 and a rear axle assembly 40 and alters the distribution of the weight therebetween by moving at least one component carried by chassis 16 along chassis 16. The component can be carrier tank 26 and/or support structure 34 with ingredient tanks 30 thereon. Carrier tank 26 and ingredient tanks 30 (along with support structure 34) can more generally be referred to as containers 26 and 30 or as components 26 and 30.

Front axle assembly 38 and rear axle assembly 40 can more generally be considered weight bearing conveyance devices 38 and 40, which although being depicted as having wheels 12 of the same size, may have tracks and/or wheels of differing sizes. Weight bearing conveyance devices 38 and 40 are more conveniently referred to as a fore conveyance device 38 and an aft conveyance device 40. Fore and aft conveyance devices 38 and 40 are fixedly connected to chassis 16 and they carry chassis 16 respectively in a fore and an aft position of chassis 16.

The weight distribution system 36 is configured to adjust a position of the component(s) 26, 30 relative to chassis 16 dependent upon a detected weight distribution between fore conveyance device 38 and aft conveyance device 40. The weight distribution system 36 generally includes a weight sensor 42, a weight sensor 44, a controller 46, a position sensor 48 and an actuator 50. Weight sensors 42 and 44 are respectively associated with fore conveyance device 38 and aft conveyance device 40. Weight sensors 42 and 44 each generate a signal representative of the weight carried respectively by fore conveyance device 38 and aft conveyance device 40. The signals are conveyed to controller 46, which executes an algorithm to determine if an adjustment of a longitudinal position of containers 26, 30 on chassis 16 is needed to adjust the weight distribution on fore conveyance device 38 and aft conveyance device 40. While weight sensor 42 and weight sensor 44 are referred to in the singular, more than one sensor may be used to produce the individual signals.

Although a controller 46 and sensors 42 and 44 are illustrated in FIG. 3, it is to be understood that these are not needed in all exemplifications of the present invention. The operator of agricultural sprayer 10 can sense the need for the weight distribution and effect the distribution by causing actuator 50 to be energized in a selected direction. For example, in anticipation of climbing a hill the operator can shift the weight forward, knowing that the angle of incline will cause the weight supported by the aft conveyance device 40 to increase. In another situation, such as a wet area, if the aft conveyance device 40 is sinking, and the fore conveyance device 38 is losing traction, then the operator can shift the weight forward to relieve the weight carried by the aft portion and to add weight to enhance the traction in the fore portion. In a reverse situation, if the fore portion is sinking into the ground, then the weight can be shifted in the aft direction.

If an adjustment of the position of containers 26, 30 is determined to be needed to alter the weight distribution of agricultural sprayer 10, then controller 46 detects the current position of containers 26 and/or 30 by way of a position sensor 48 and effects the movement by activating actuator(s) 50 to move containers 26 and/or 30 a prescribed distance in a fore or aft direction 52, as appropriate. Position sensor 48 may be integral with actuator 50, or may not be needed at all. Controller 46 is also in communication with a control panel (not shown) in cab 28 allowing an operator to activate or disable weight distribution system 36 and to assign weight distribution criteria for differing transport activities. It is contemplated that multiple weight distribution criteria may be carried out dependent upon the operational activity of agricultural sprayer 10. For example, when in a road transport mode (booms 18 and 20 folded and in a road gear) that a weight distribution biased with an increased weight on aft conveyance device 40 may be desirable. Another example, is when in a spraying mode with booms 18 and 20 extended that an equal weight distribution between fore conveyance device 38 and aft conveyance device 40 may be desired.

It is also contemplated that the present invention may include an accommodation if wheels 12 have differing ground profiles from front to back. Controller 46 is configured to adjust the position of the component(s) 26 and/or 30 dependent upon a computed value relating to the compression of the ground beneath fore conveyance device 38 and a computed value relating to the compression of the ground beneath aft conveyance device 40, so as to equalize the weight per unit of area each wheel 12 exerts upon the ground. The information regarding the footprint of the wheels being entered by the operator, if needed. If wheels 12 are the same size then no bias is needed in the calculation to offset differing wheel profiles.

It is further contemplated to allow the operator to command controller 46 to position containers 26 and 30 at a desired location along chassis 16. For example, when a maintenance action is needed then containers 26 and 30 can be move out of the way for the maintenance action to be carried out. Another example, could occur if agricultural sprayer 10 is stuck in the field or is experiencing wheel slippage on one axle, then the operator can cause containers 26 and 30 to be moved to enhance the overall traction of agricultural sprayer 10.

The present invention can also be considered a method of distributing weight of agricultural sprayer 10. The method can include several steps including the steps of detecting and adjusting. The detecting step detects a weight distribution between the fore conveyance device 38 and the aft conveyance device 40. The adjusting step adjusts a position of component 26 and/or 30 relative to chassis 16 dependent upon a detected weight distribution determined in the detecting step. These detecting and adjusting steps take place as the ingredient in component 26 and/or 30 is applied to the geographical area.

The detecting step may further include the step of creating fore and aft weight signals that are respectively representative of weight carried by fore conveyance device 38 and aft conveyance device 40. Those signals being conveyed to controller 46, which uses the information contained in the signals to adjust the at least one actuator 50, coupled to component 26 and/or 30 to thereby move component 26 and/or 30 in a fore or aft direction 52 along chassis 16. It can be considered that controller 46 may further compute values respectively relating to the compression of ground beneath wheels 12 of fore conveyance device 38 and aft conveyance device 40. The computed values take into account potential differences associated with differing size wheels 12, so that the adjusting step, previously discussed, is dependent upon the computed values. Assuming that there is no substantial difference in wheels 12, then the adjusting step can endeavor to approximately, or substantially, equalize the two computed values by adjusting the position of component 26 and/or 30.

Advantageously, the present invention dynamically balances the weight distribution of agricultural sprayer 10 as the contents of containers 26 and/or 30 are expended. Another advantage of the present invention is that it allows for enhancement of the handling characteristics of the sprayer.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement for applying an ingredient to a geographic area, said agricultural implement comprising:
   a chassis;
   a plurality of weight bearing conveyance devices including a fore conveyance device and an aft conveyance device, said fore and aft conveyance devices being connected to said chassis respectively in a fore and an aft position of said chassis for moving the agricultural implement across said geographic area;
   at least one component carried by and coupled to said chassis, said at least one component holding the ingredient; and
   a weight distribution system configured to allow movement of a position of said at least one component along said chassis only in a fore or aft direction,
   wherein said weight distribution system is further configured to move said position of said at least one component in only said fore or aft direction along said chassis as the ingredient is removed from said at least one component and is applied to the geographical area.

2. The agricultural implement of claim 1, wherein said weight distribution system is configured to move the position of said at least one component dependent upon a detected weight distribution between said fore conveyance device and said aft conveyance device, the weight distribution system includes:
   a fore weight detector associated with said fore conveyance device and configured to create a fore weight signal representative of a weight carried by said fore conveyance device;
   an aft weight detector associated with said aft conveyance device and configured to create an aft weight signal representative of a weight carried by said aft conveyance device;
   at least one actuator coupled to said at least one component and configured to move said at least one component along said chassis; and
   a controller communicatively coupled to said fore weight detector, said aft weight detector and said at least one actuator.

3. The agricultural implement of claim 2, wherein said controller is configured to receive said signals and to actuate said at least one actuator dependent upon values of said signals.

4. The agricultural implement of claim 3, wherein said controller is further configured to move said position of said at least one component dependent upon a first computed value relating to a compression of ground beneath said fore conveyance device and a second computed value relating to a compression of ground beneath said aft conveyance device.

5. The agricultural implement of claim 4, wherein said controller is further configured to move said position of said at least one component to approximately equalize said first computed value and said second computed value.

6. The agricultural implement of claim 1, further comprising a foldable member coupled to said chassis, said weight distribution system moving the position of said at least one component dependent upon whether or not said foldable member is in a transport mode.

7. A weight distribution system for use with an agricultural implement configured to apply an ingredient to a geographic area, the agricultural implement having a chassis and a plurality of weight bearing conveyance devices including a fore conveyance device and an aft conveyance device, the fore and aft conveyance devices being connected to the chassis respectively in a fore and an aft position of the chassis for moving the agricultural implement across said geographic area, and at least one movable component carried by and coupled to the chassis, the weight distribution system comprising:

at least one actuator configured to move a position of the at least one movable component relative to the chassis to thereby alter a weight distribution between the fore conveyance device and the aft conveyance device, the at least one movable component being said at least one movable component holding the ingredient, said at least one actuator moving a position of said at least one movable component along the chassis only in a fore or aft direction, wherein said at least one actuator is further configured to move said position of said at least one movable component in only said fore or aft direction as the ingredient is removed from said at least one movable component and is applied to the geographical area.

8. The weight distribution system of claim 7, further comprising:

a controller;

a fore weight detector associated with said fore conveyance device and configured to create a fore weight signal representative of a weight carried by said fore conveyance device; and an aft weight detector associated with said aft conveyance device and configured to create an aft weight signal representative of a weight carried by said aft conveyance device, and said at least one actuator being coupled to said at least one movable component and configured to move said at least one movable component along said chassis, said controller being communicatively coupled to said fore weight detector, said aft weight detector and said at least one actuator.

9. The weight distribution system of claim 8, wherein said controller is further configured to receive said signals and to actuate said at least one actuator dependent upon values of said signals.

10. The weight distribution system of claim 9, wherein said controller is further configured to move said position of said at least one movable component dependent upon a first computed value relating to a compression of ground beneath said fore conveyance device and a second computed value relating to a compression of ground beneath said aft conveyance device.

11. The weight distribution system of claim 10, wherein said controller is further configured to move said position of said at least one movable component to approximately equalize said first computed value and said second computed value.

12. The weight distribution system of claim 7, further comprising a foldable member coupled to said chassis, the weight distribution system moving the position of said at least one movable component dependent upon whether said foldable member is folded inward or is extended outward.

13. A method of distributing weight of an agricultural implement configured to apply an ingredient to a geographic area, the agricultural implement having a chassis and a plurality of weight bearing conveyance devices including a fore conveyance device and an aft conveyance device, the fore and aft conveyance devices being connected to the chassis respectively in a fore and an aft position of the chassis for moving the agricultural implement across said geographic area, and at least one movable component carried by and coupled to the chassis, the method comprising the steps of:

determining that a weight distribution change between the fore conveyance device and the aft conveyance device is needed; and moving a position of the at least one movable component along the chassis in only a fore or aft direction dependent upon a detected weight distribution determined in said determining step, said at least one movable component holding the ingredient that is being applied to the geographic area, wherein said steps are carried out by a controller that is configured to move said position of said at least one movable component as the ingredient is applied to the geographical area.

14. The method of claim 13, wherein said determining step includes the steps of:

creating a fore weight signal representative of a weight carried by said fore conveyance device, said fore weight signal being created by a fore weight detector associated with said fore conveyance device; and creating an aft weight signal representative of a weight carried by said aft conveyance device, said aft weight signal being created by an aft weight detector associated with said aft conveyance device, said moving step including the step of adjusting at least one actuator coupled to said at least one movable component to thereby move said at least one movable component along said chassis.

15. The method of claim 14, wherein said moving a position step is dependent upon values of said signals, said moving a position step including the step of actuating said at least one actuator dependent upon said values of said signals.

16. The method of claim 13, further comprising the step of:

computing a first value relating to a compression of ground beneath said fore conveyance device and a second value relating to a compression of ground beneath said aft conveyance device, said moving step being dependent upon said first value and said second value.

17. The method of claim 16, wherein said at least one movable component is longitudinally moved in said moving step to approximately equalize said first value and said second value.

* * * * *